United States Patent [19]

Chang et al.

[11] Patent Number: 5,106,601
[45] Date of Patent: Apr. 21, 1992

[54] PROCESS FOR THE REMOVAL OF ACID FORMING GASES FROM EXHAUST GASES AND PRODUCTION OF PHOSPHORIC ACID

[75] Inventors: Shih-Ger Chang, El Cerrito; David K. Liu, San Pablo, both of Calif.

[73] Assignee: The Regents of the University of California, Alameda, Calif.

[21] Appl. No.: 518,722

[22] Filed: May 4, 1990

Related U.S. Application Data

[63] Continuation-in-part of Ser. No. 261,229, Oct. 24, 1988.

[51] Int. Cl.$^5$ .................... C01B 21/00; C01B 17/00; C01B 25/16
[52] U.S. Cl. .................... 423/235; 423/242; 423/317
[58] Field of Search .................... 423/242 A, 235, 317, 423/242 R

[56] References Cited

U.S. PATENT DOCUMENTS 4,482,527  11/1984  Lehr et al. .................... 423/235

FOREIGN PATENT DOCUMENTS 3238424  4/1984  Fed. Rep. of Germany ...... 423/235
59-97505  6/1984  Japan .................... 423/235

OTHER PUBLICATIONS

Kirk-Othmer Encyclopedia of Chemical Technology vol. 17, 1982, 434-441.

Primary Examiner—Gregory A. Heller
Attorney, Agent, or Firm—Phillips, Moore, Lempio & Finley

[57] ABSTRACT

Exhaust gases are treated to remove NO or $NO_x$ and $SO_2$ by contacting the gases with an aqueous emulsion or suspension of yellow phosphorous preferably in a wet scrubber. The addition of yellow phosphorous in the system induces the production of $O_3$ which subsequently oxidizes NO to $NO_2$. The resulting $NO_2$ dissolves readily and can be reduced to form ammonium ions by dissolved $SO_2$ under appropriate conditions. In a 20 acfm system, yellow phosphorous is oxidized to yield $P_2O_5$ which picks up water to form $H_3PO_4$ mists and can be collected as a valuable product. The pressure is not critical, and ambient pressures are used. Hot water temperatures are best, but economics suggest about 50° C. The amount of yellow phosphorus used will vary with the composition of the exhaust gas, less than 3% for small concentrations of NO, and 10% or higher for concentrations above say 1000 ppm. Similarly, the pH will vary with the composition being treated, and it is adjusted with a suitable alkali. For mixtures of $NO_x$ and $SO_2$, alkalis that are used for flue gas desulfurization are preferred. With this process, better than 90% of $SO_2$ and NO in simulated flue gas can be removed. Stoichiometric ratios (P/NO) ranging between 0.6 and 1.5 were obtained.

28 Claims, 13 Drawing Sheets

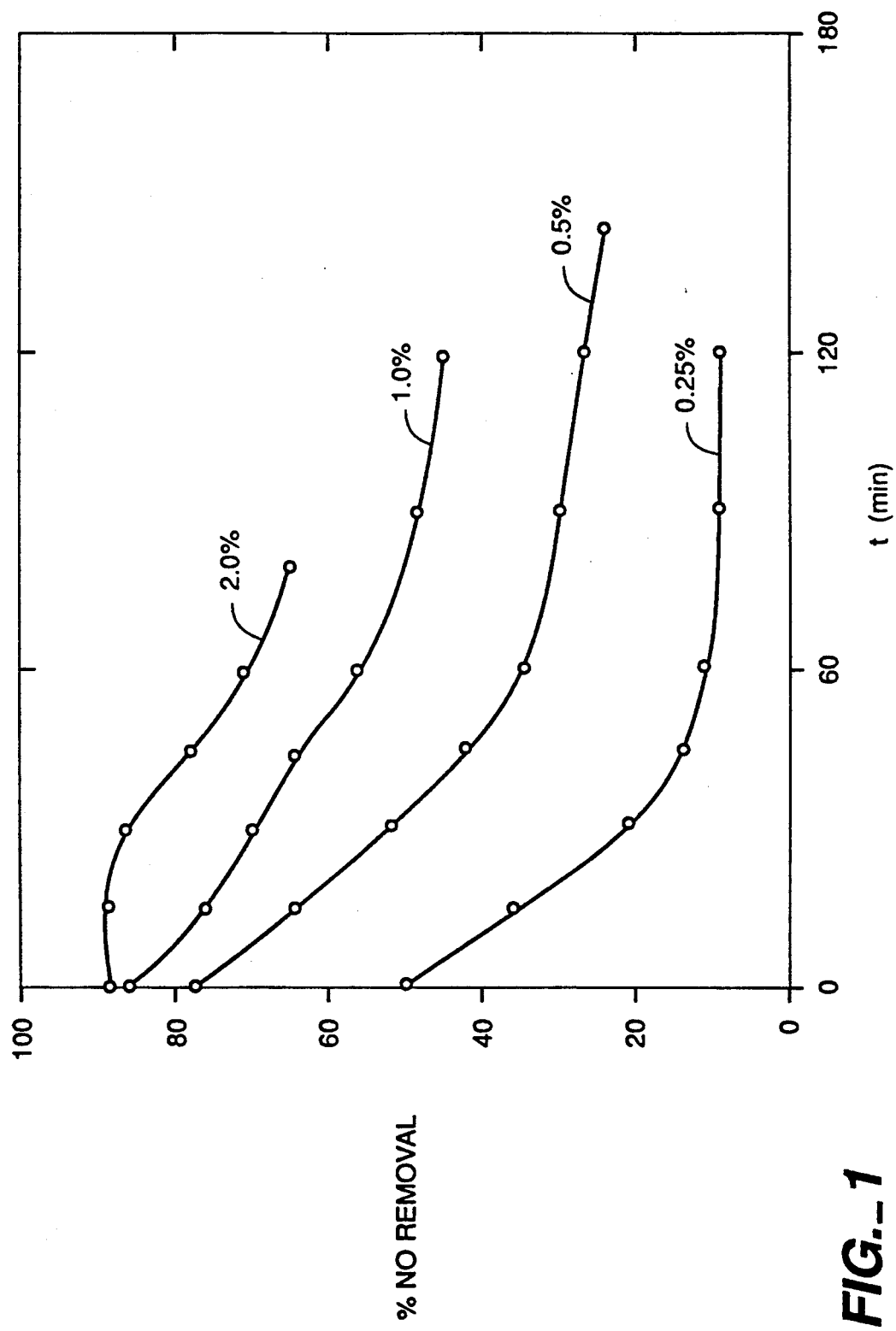
FIG._1

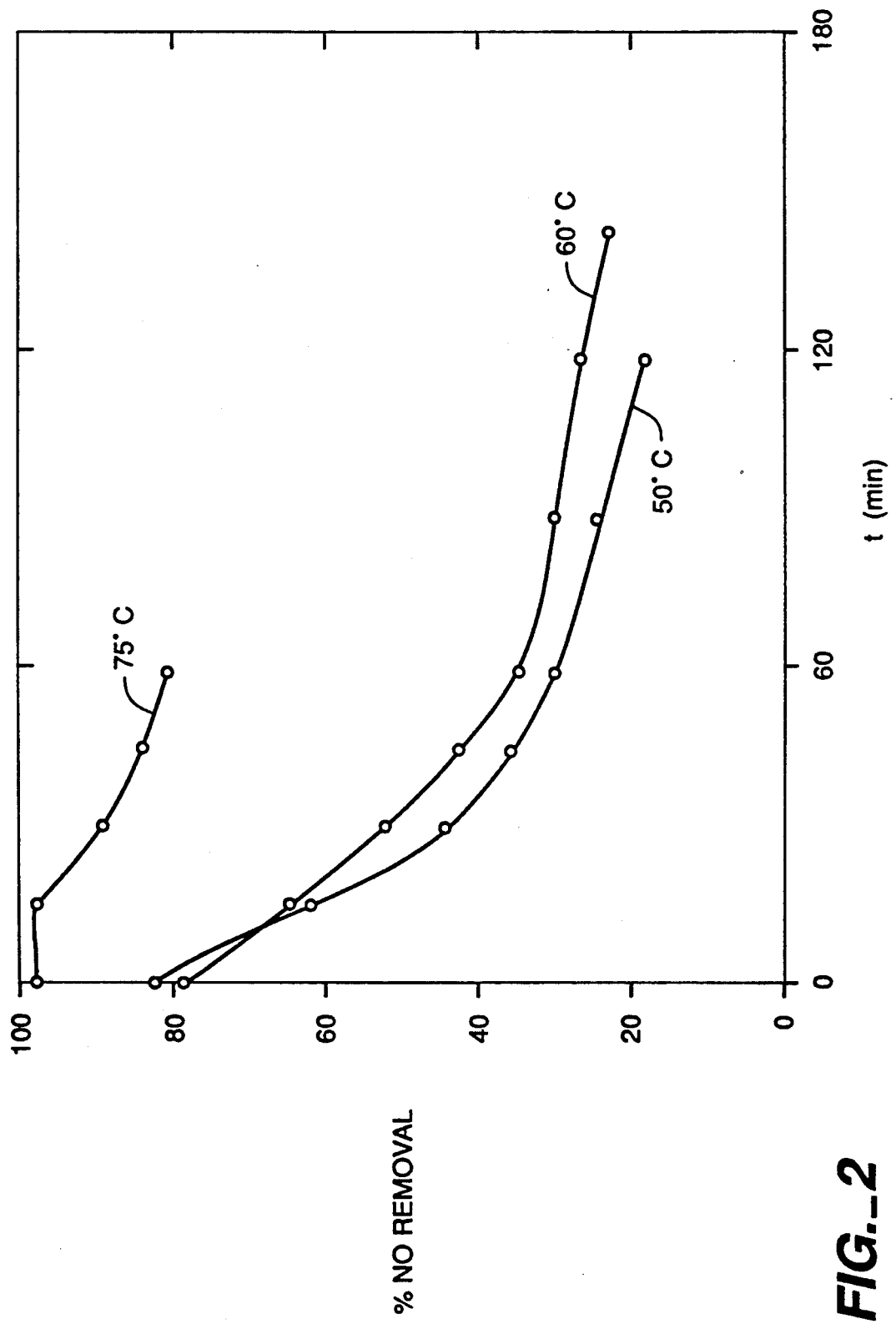
FIG._2

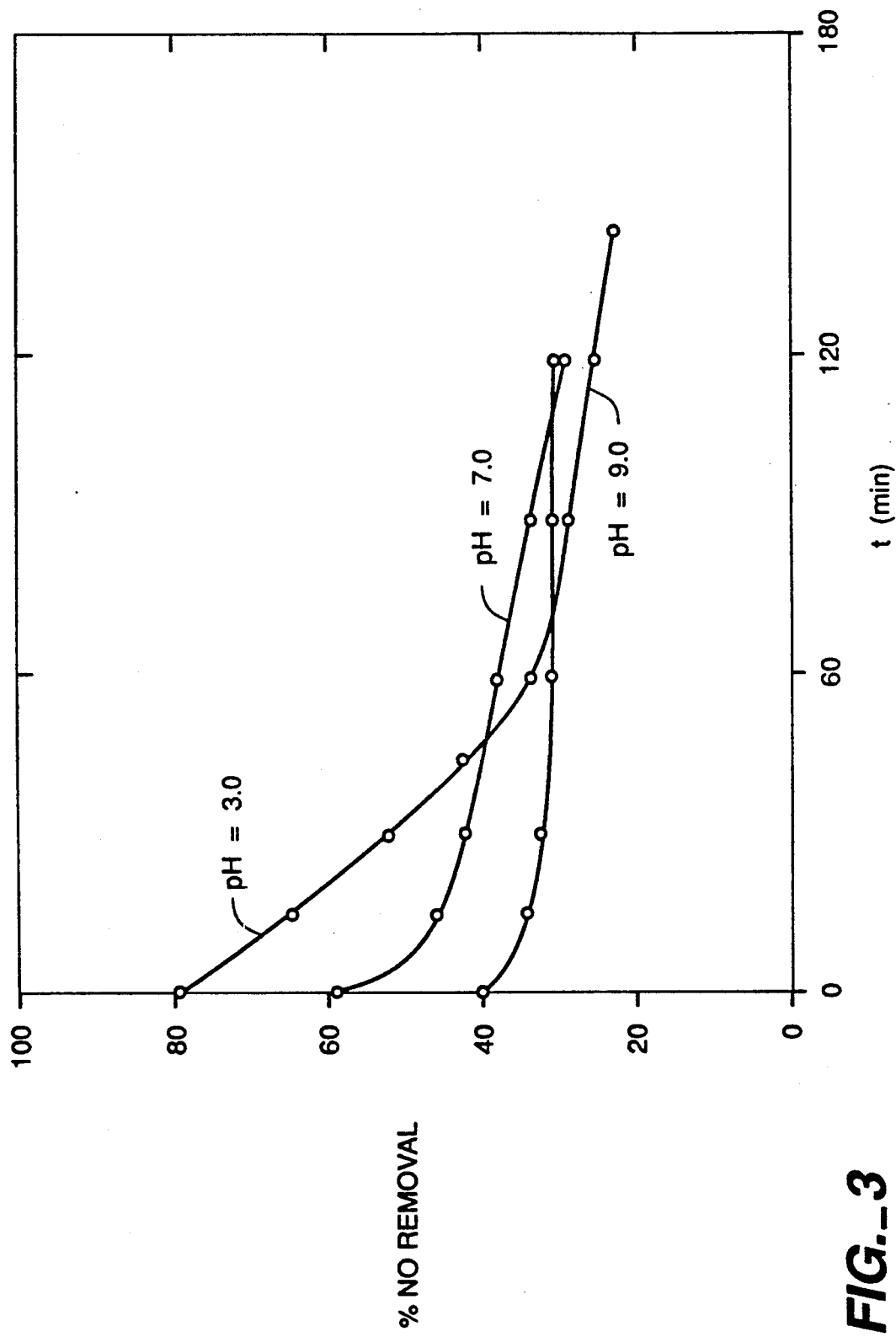
FIG._3

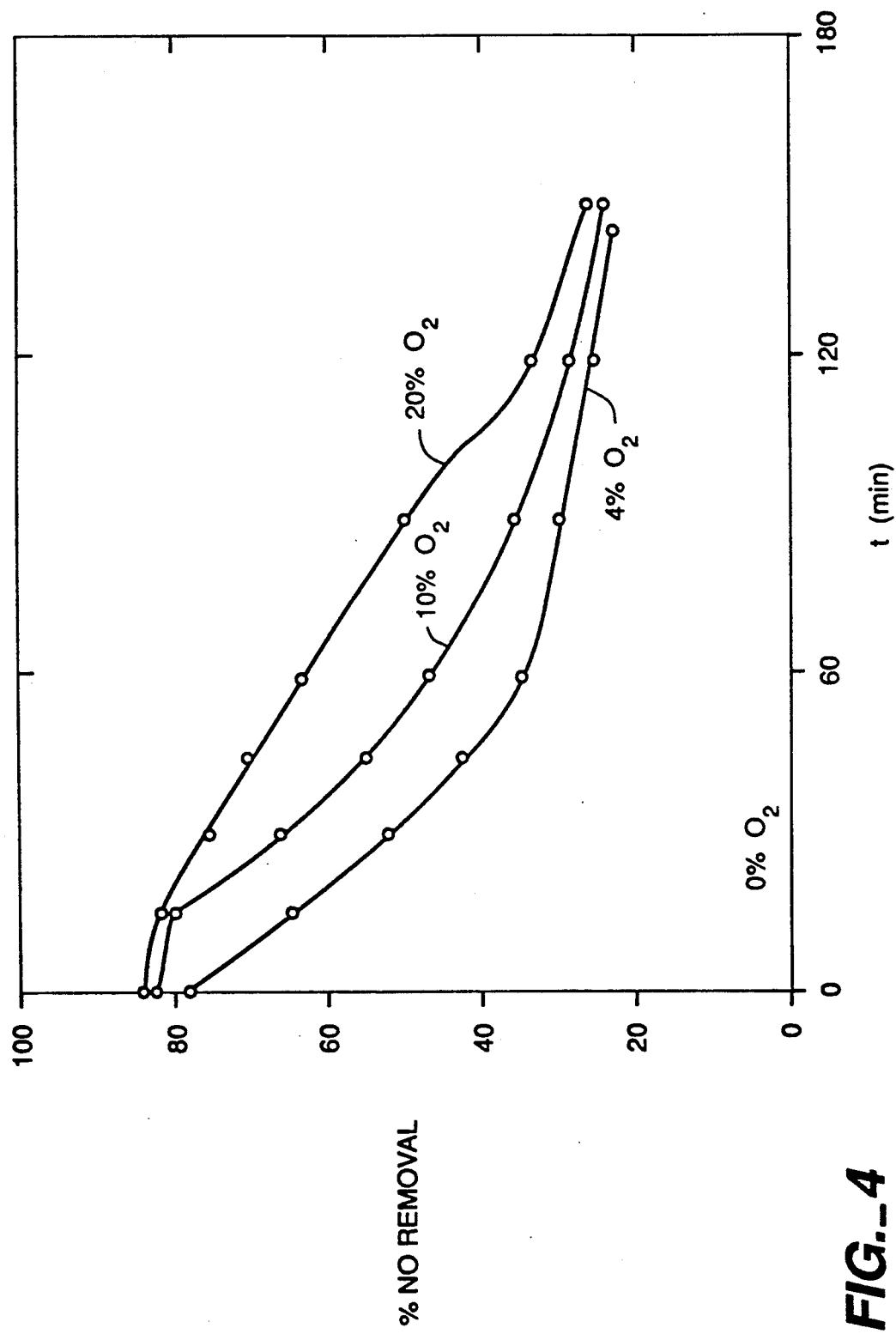
FIG._4

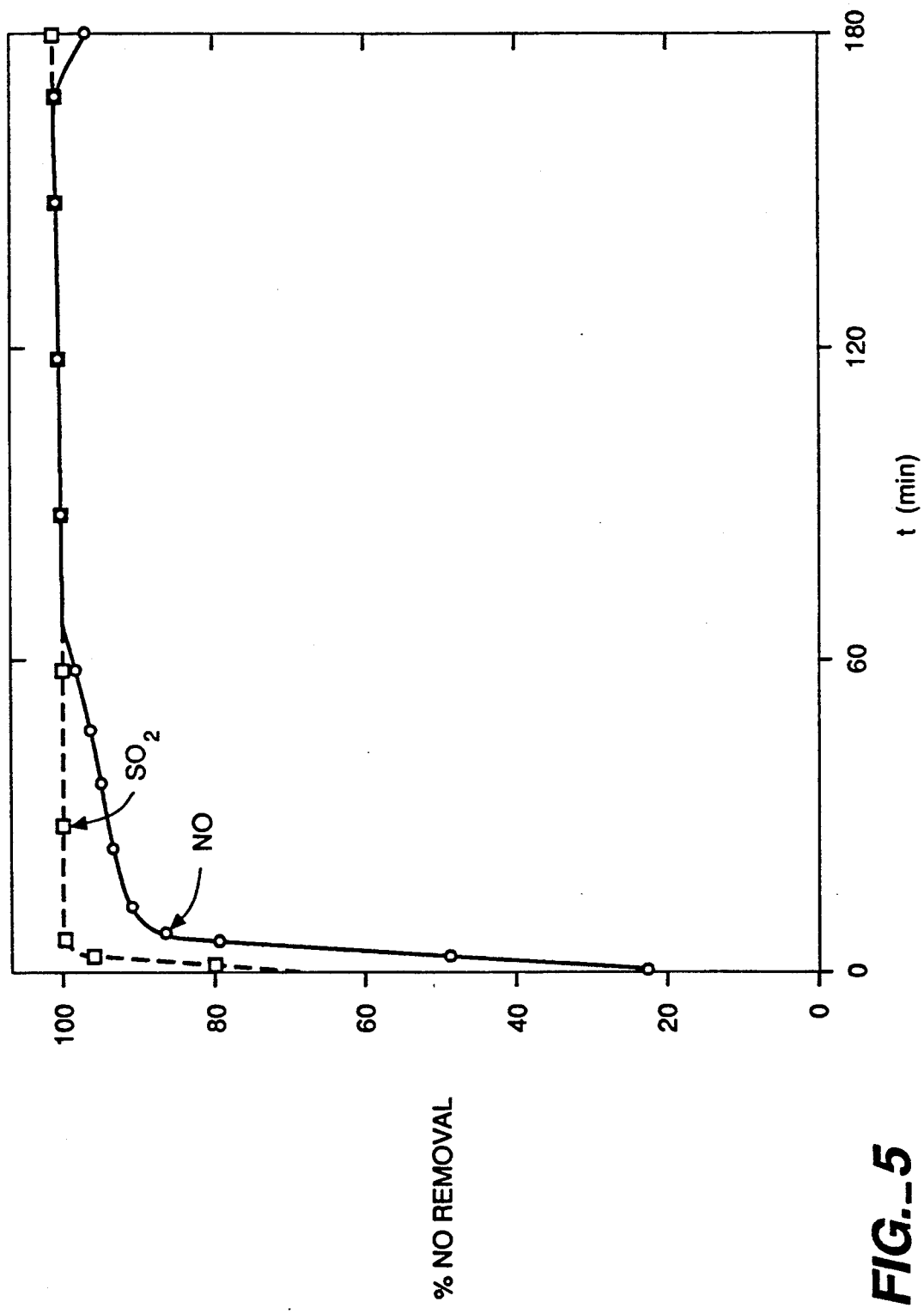
FIG._5

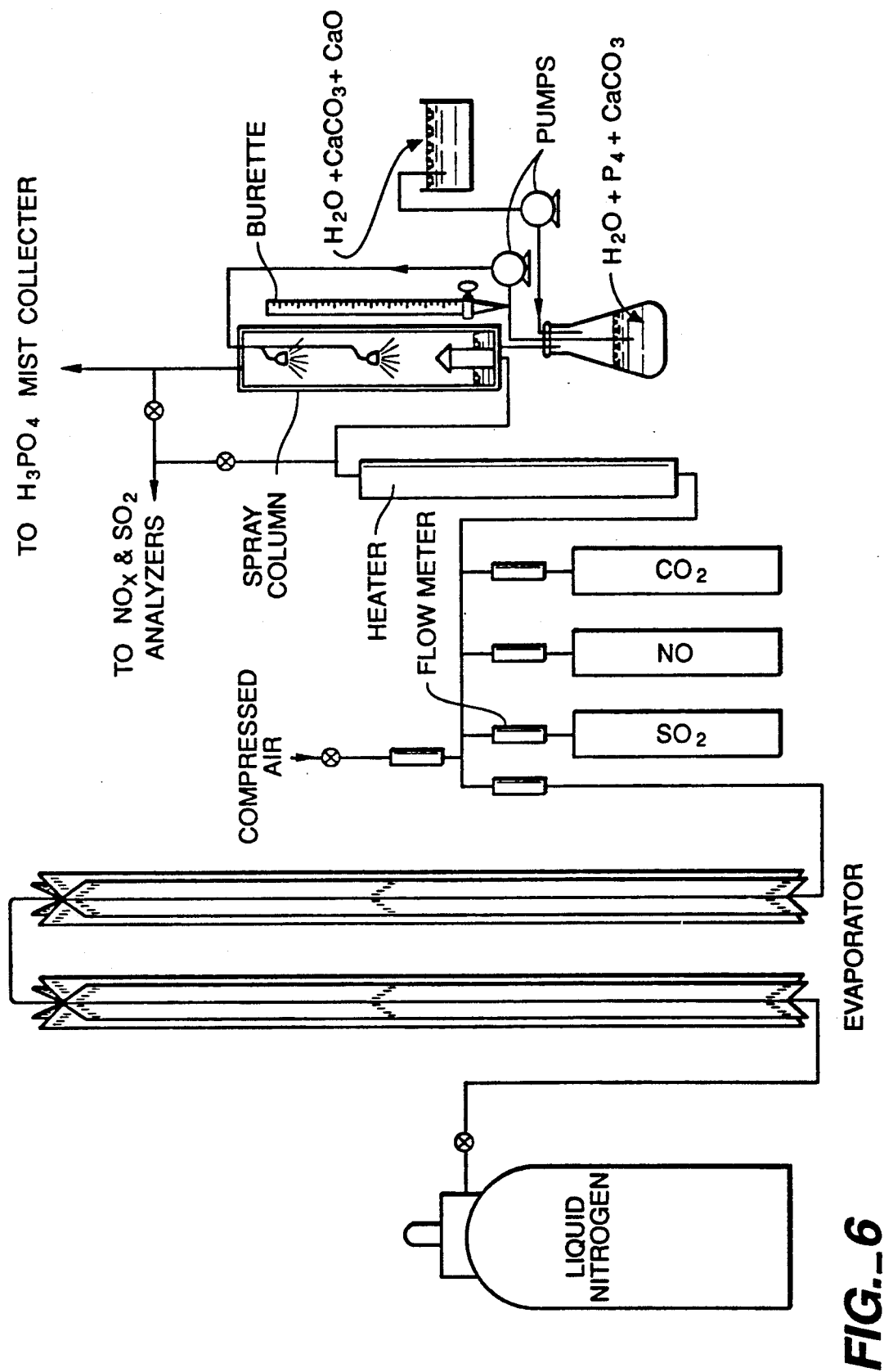
FIG._6

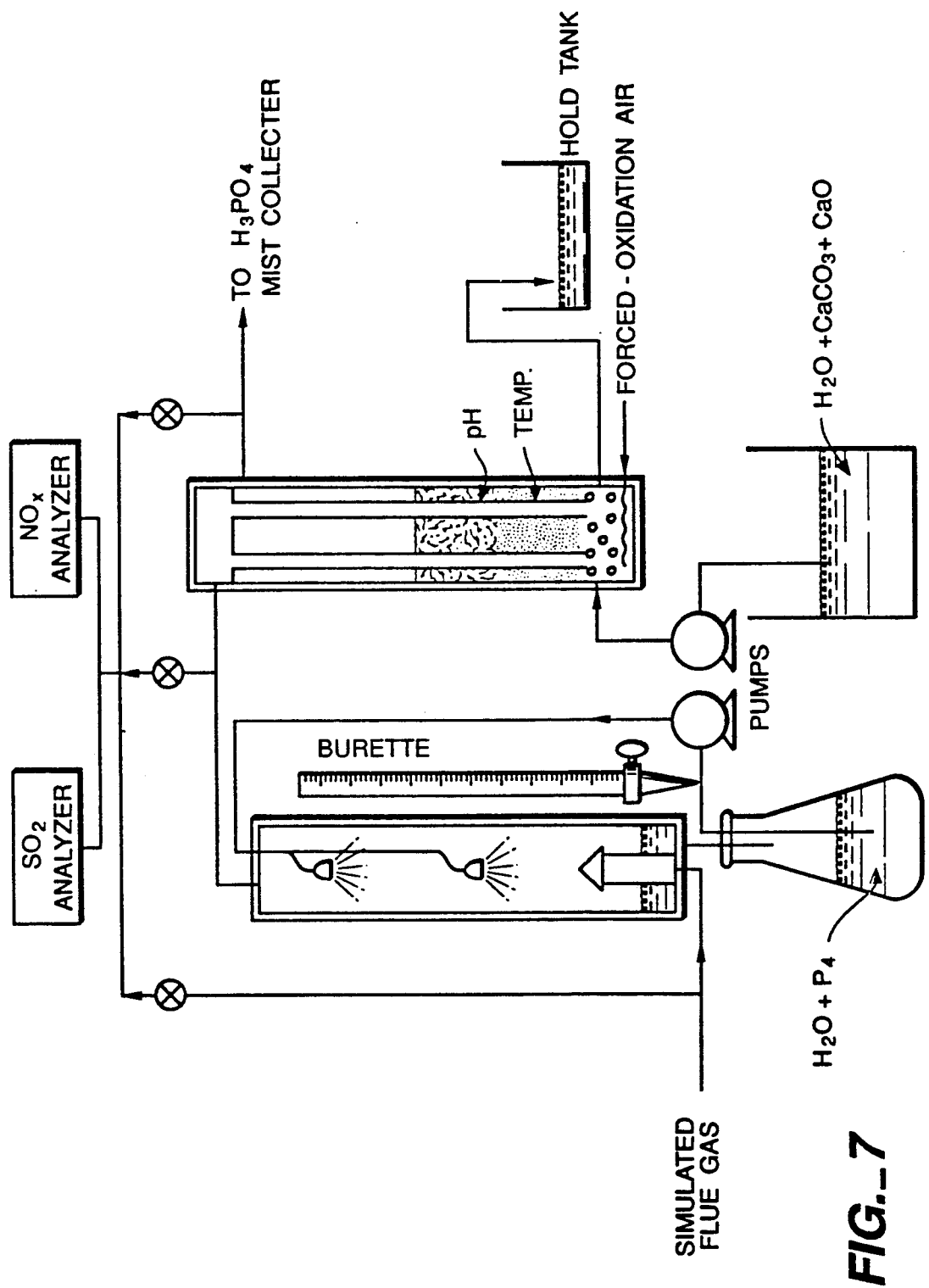
FIG._7

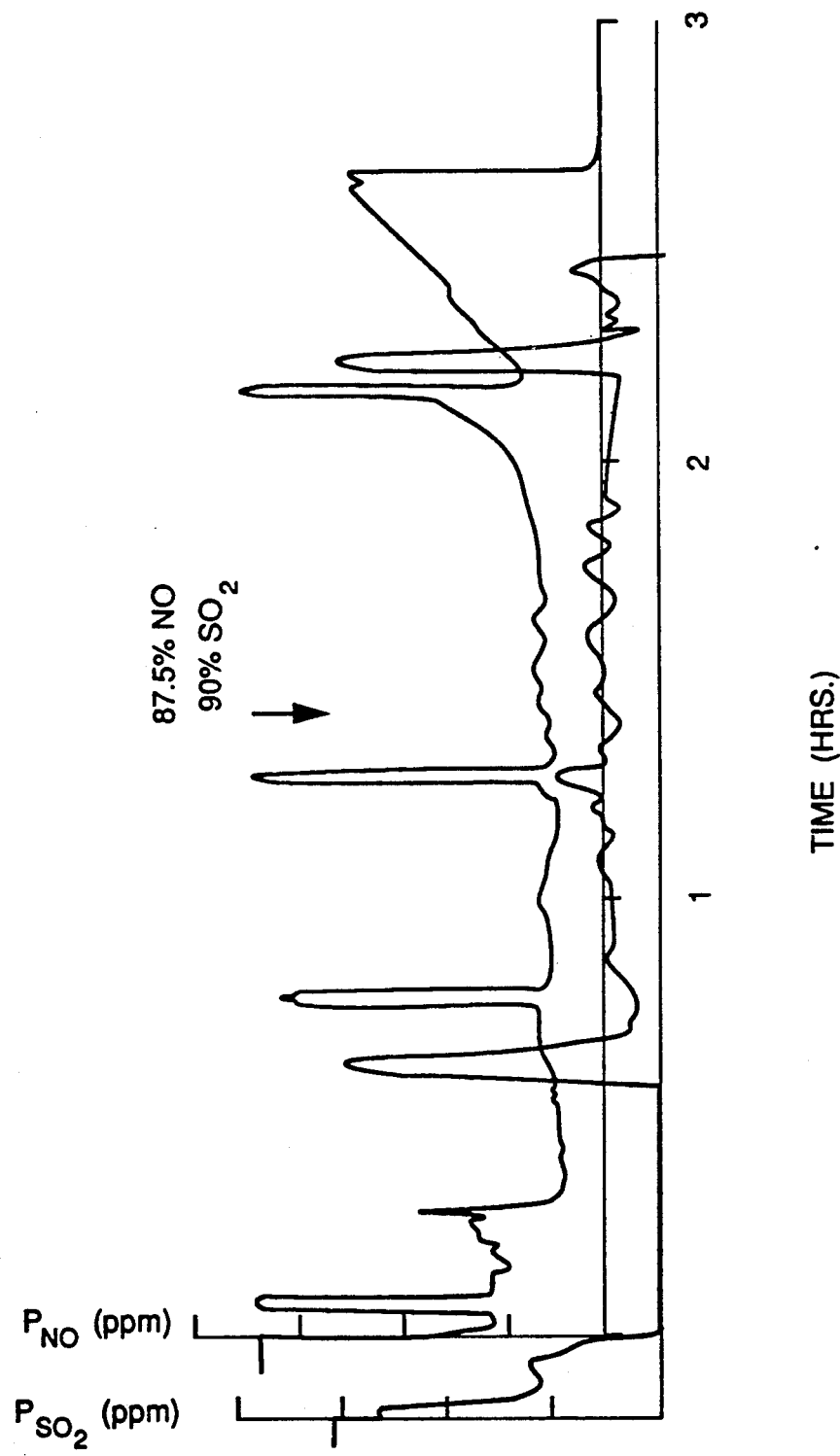
FIG._8

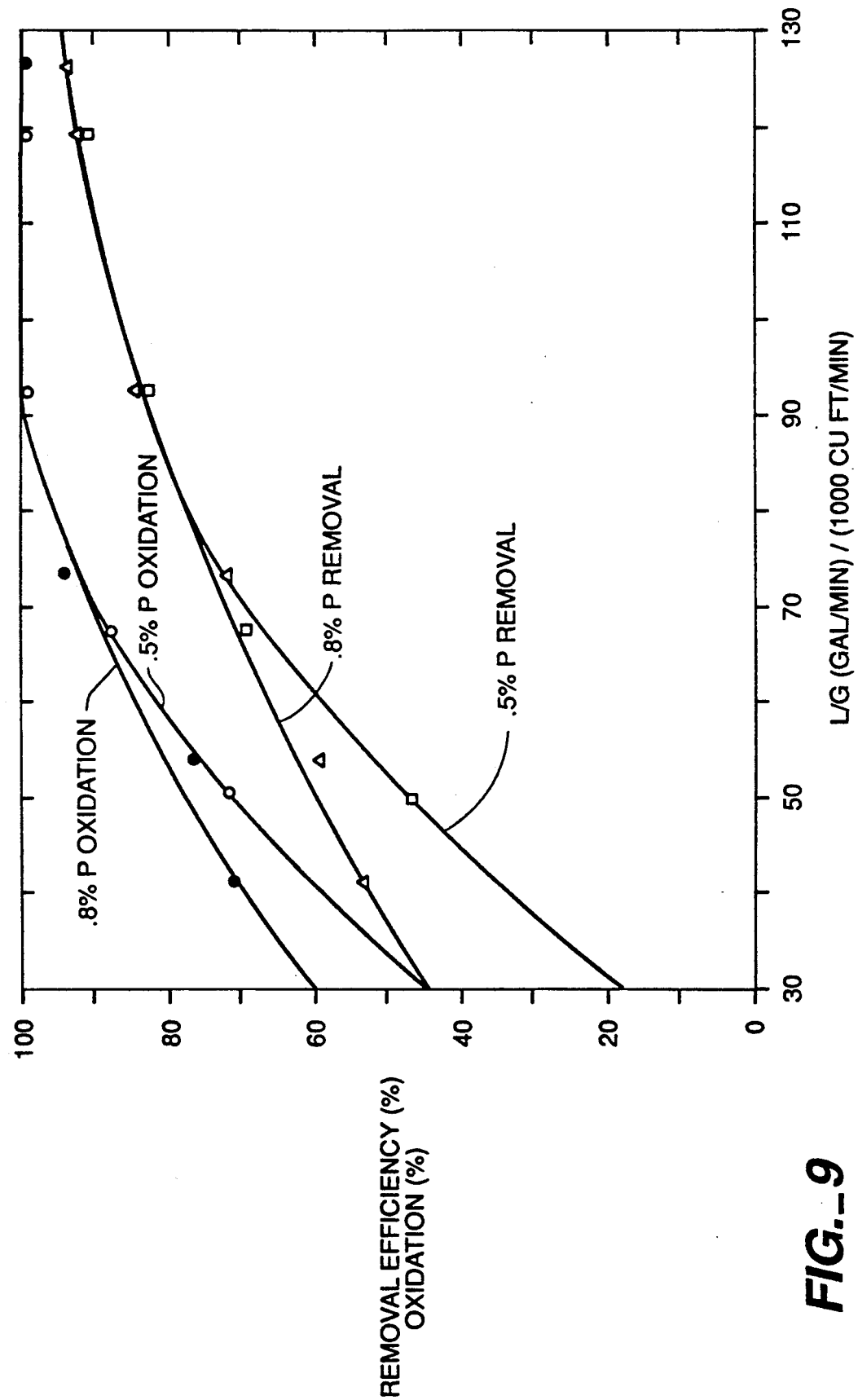
FIG._9

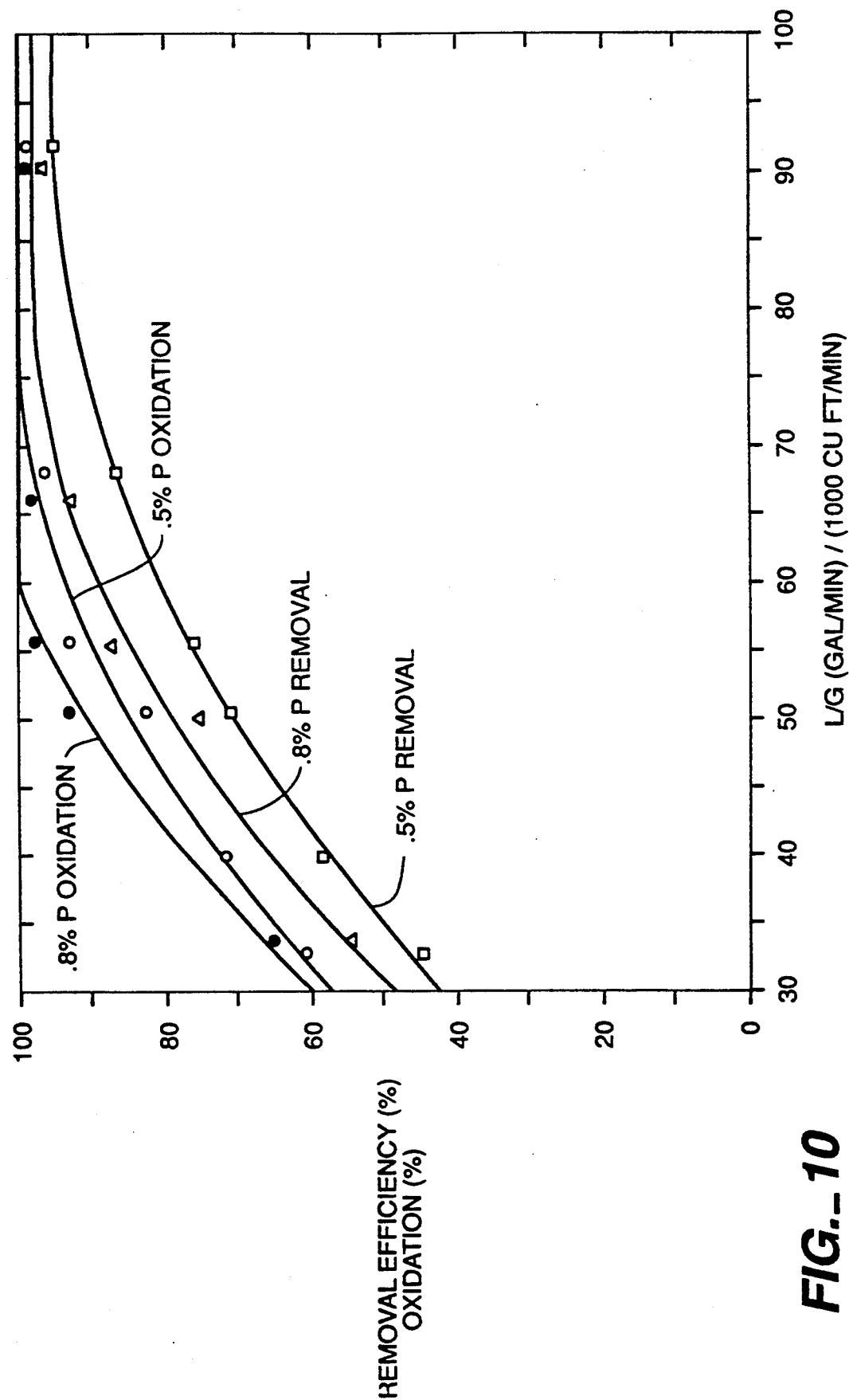
FIG._10

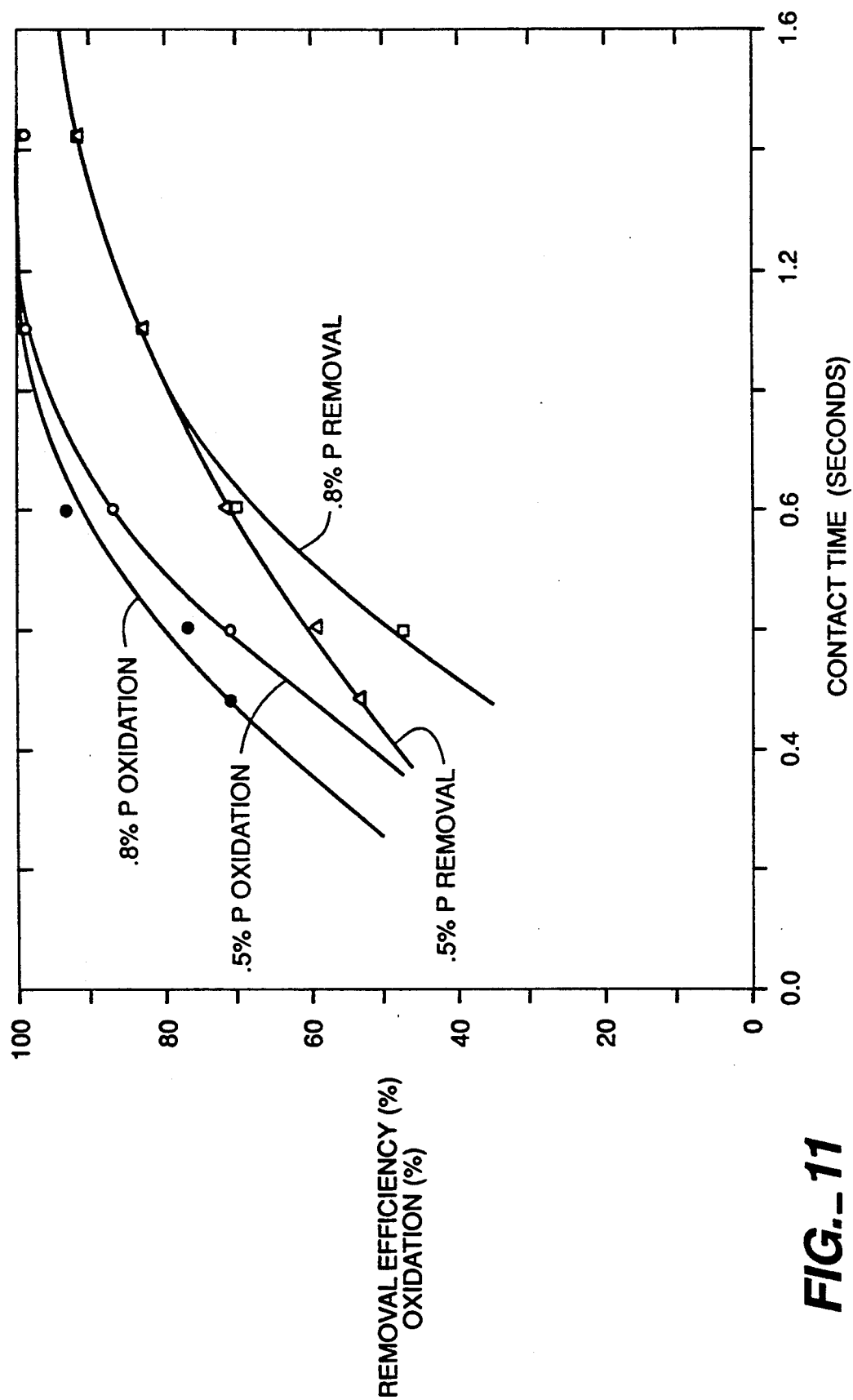
FIG._11

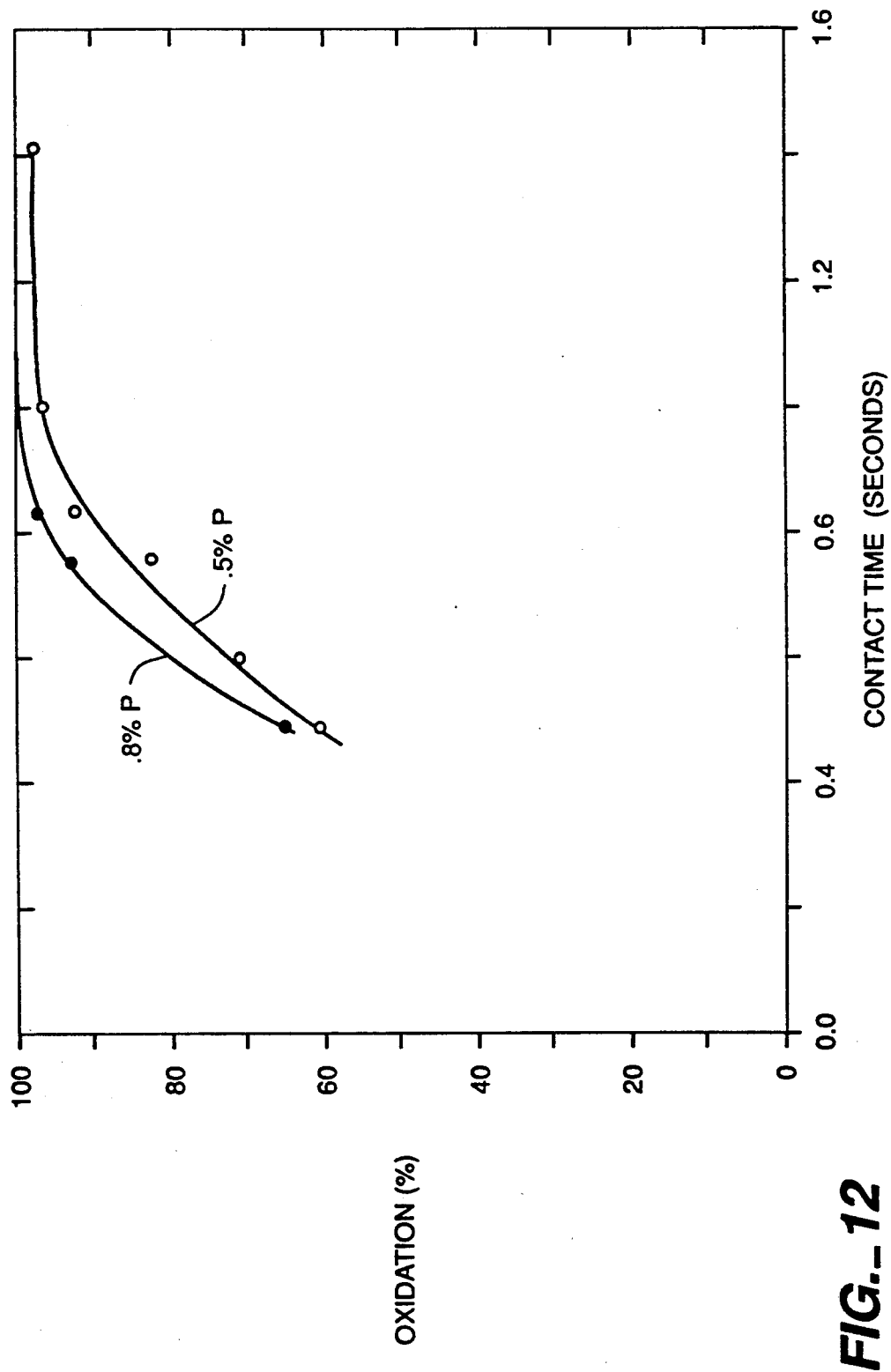
FIG._12

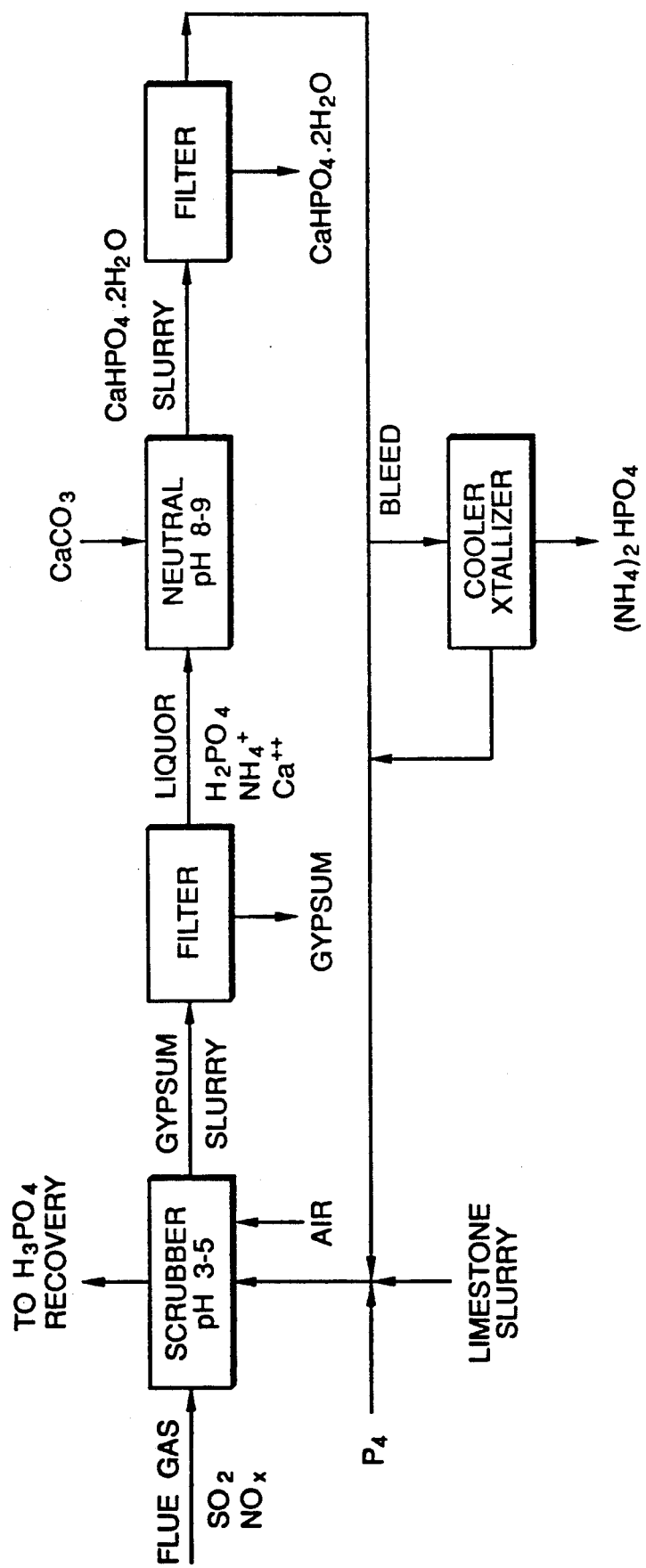
FIG._13

PROCESS FOR THE REMOVAL OF ACID FORMING GASES FROM EXHAUST GASES AND PRODUCTION OF PHOSPHORIC ACID

The U.S. Government has rights in this invention pursuant to Contract No. DE-AC03-76SF00098 awarded by the U.S. Department of Energy to the University of California.

This application is a continuation-in-part of co-pending application Ser. No. 261,229, filed Oct. 24, 1988 now allowed.

BACKGROUND OF THE INVENTION

The present invention relates to an improved process for the removal of acid gases including $NO_x$ from exhaust gases, particularly to a combined removal of $NO_x$ and $SO_2$ from flue gas and the like and also to the acquisition of valuable products from the process. (Flue gas usually contains both nitric oxide (NO) and nitric dioxide ($NO_2$); these oxides of nitrogen are collectively given as $NO_x$.)

Concerns about air pollution caused by acid rain are increasing world wide, and considerable research effort is being expended to provide effective treatment of flue gases and other exhaust gases to remove acid forming components therefrom. However, the present methods have disadvantages which are particularly acute with respect to the removal of $NO_x$. In addition, the present methods are extremely costly.

Early methods were primarily used to remove pollutants when the concentrations were very high. As time goes by, and larger volumes of gases are generated, tolerable levels of emissions keep getting lower and lower. At this time emissions may be treated to obtain acceptable levels of $SO_2$ by means of scrubbing processes using aqueous solutions. However, removal of $NO_x$ presents problems, the most serious being sufficient removal and economic considerations. In addition, the economics of using two processes has prompted efforts to utilize wet scrubbing for removal of both $NO_x$ and $SO_2$ in a single process, and some success has been achieved in this direction. Due to the difficulty in solubilizing NO in aqueous solution, these processes have utilized expensive ingredients and often have provided other products requiring disposal.

Wet processes developed for removal of $NO_x$ have been reported. For example, Patent No. P 32 38 424.6 issued by the Federal Republic of Germany Apr. 19, 1984 to Hoechst AG utilizes red phosphorus in inert oxidizing media to remove NO and $NO_2$ from flue gas. However, the patent reports the treatment of very high concentrations of NO, typical concentrations being up in the thousands of parts per million, and in Example 7 of the patent where 1000 parts per million were treated, only 40% was removed. In the two part Example 9, the patentee reports 14,000 parts per million were treated in the first step to obtain a 90% removal to 1,300 parts per million; and in the second part about a 65% removal to about 460 parts per million. Such effluent concentrations are not sufficiently low enough, and we have found that red phosphorus is not satisfactory to treat concentrations of 500 parts per million or less.

Current $NO_x$ standards for power plant emissions may be attainable using the selective catalytic reduction (SCR) process which is very expensive. In addition, there is very limited experience with SCR on US coal with high sulfur content and variable ash composition. High $SO_2$ concentration promotes the formation of ammonium sulfate/bisulfate particulates, which result in the plugging of air heaters of boilers. Ash composition rich in arsenic and alkali could be detrimental to catalysts employed in the SCR system. Other approaches for the reductions to amounts less than 100 ppm are reported in U.S. Pat. No. 4,079,118 entitled Method for Removing Nitrogen Oxides Using Ferric ion-EDTA Complex Solutions issued Mar. 14, 1978, and various other wet processes have been developed to provide efficient removal of $NO_x$. However, these processes generally require either the use of expensive starting materials or create a disposal problem for the products of the processes or both.

Numerous other patents have been issued which disclose wet processes for removal of $NO_x$ such as U.S. Pat. No. 3,984,522; U.S. Pat. No. 4,079,118 and U.S. Pat. No. 4,158,044. In addition, many patents have issued which disclose combined processes for removal of both $SO_2$ and $NO_x$. Examples of such patents include U.S. Pat. Nos. 4,126,529 and 4,347,227. Many other systems have been suggested, and the list is too long to include them all. However, there is much room for improvement in providing a practical, efficient removal process for both of such pollutants either individually or together.

As mentioned above, sulfur oxides can be effectively removed by flue gas desulfurization scrubbers. The majority of these scrubbers now in use involve wet limestone processes, which utilize aqueous slurries of limestone to neutralize the sulfurous and/or sulfuric acids produced from the dissolution and subsequent oxidation of flue gas $SO_2$ in scrubbing liquors. The resulting solid slurries, containing $CaSO_3.\frac{1}{2}H_2O$ and gypsum ($CaSO_4.2H_2O$), can be hauled away for disposal. Such practice is common among power plants located in areas where landfill space is abundant. On the other hand, the more practical solution for power plants situated in densely populated areas is to operate the scrubbers under forced oxidation conditions. Under those circumstances, the major by-product of the scrubbing process is gypsum, which is of some commercial value as a building material.

Further versatility in the processing by flue gas desulfurization scrubbers is obtained by utilizing other alkalis besides limestone or lime. These include soda ash ($Na_2CO_3$), nahcolite ($NaHCO_3$), trona ($Na_2CO_3/NaHCO_3$), $Na_2SO_3$, NaOH, KOH, $K_2CO_3/KHCO_3$, magnesite ($MgCO_3$), dolomite ($CaCO_3/MgCO_3$), $NH_4OH$, and $(NH_4)_2CO_3/NH_4HCO_3$. These materials are more expensive than limestone and are more often used in chemical industries where the volume of waste gas to be treated is small compared to those from power plants, and where the plants are in close proximity to the production sites of those alkalis.

While the wet flue gas desulfurization scrubbers described above are very efficient in the removal of $SO_2$ from flue gas, they are incapable of removing sufficient NO because of its low solubility in aqueous solution. NO makes up about 95% of the $NO_x$ in most flue or exhaust gases. The installation of a separate scrubber for flue gas denitrification generally requires additional capital investment. Accordingly, approaches to modify existing wet flue gas desulfurization processes for the simultaneous removal of $SO_2$ and $NO_x$ emissions have been under world wide investigation.

Several methods have been developed to enhance the absorption of $NO_x$ in scrubbing liquors. These include the oxidation of NO to the more soluble $NO_2$ using oxidants such as $O_3$, $ClO_2$, and $KMnO_4$, as well as the addition of various iron(II) chelates to the scrubbing liquors to bind and activate NO (See, H. I. Faucett, J. D. Maxell and T. A. Burnett, "Technical Assessment of $NO_x$ Removal Process for Utility Application", EPRI AF-568. EPA600/7-77-127 March, 1978). So far, none of these methods has been demonstrated to be cost effective, despite high removal efficiencies of both $SO_2$ and $NO_x$.

SUMMARY OF THE INVENTION

A primary object of this invention is to provide a wet scrubbing process wherein $NO_x$ may be removed from exhaust gases such as flue gas to a degree that the remaining concentrations may be lower than 200 parts per million, and, if desired, lower than 10 to 20 parts per million by volume.

This objective is achieved by a method of treating exhaust gases containing $NO_x$ comprising the step of contacting the exhaust gas with an aqueous emulsion or suspension containing yellow phosphorus ($P_4$). The contact of the exhaust gas may be by any suitable contact method such as in a spray type or a bubbling type absorber. At least some oxygen or oxygen source must be present in the exhaust gases, and most exhaust gases contain a sufficient amount; however, air or other sources of oxygen may be added to the exhaust gas when needed or wanted. The pressure is not critical, and the process is generally carried out at ambient or such positive pressures needed to move the gases through a scrubber.

The temperature of the process is operative throughout the liquid range for water, and optimally in the range of about 20° C. to about 95° C., with a preferred range of about 45° C. to 75° C. The concentration of yellow phosphorus (also known as white phosphorus) required is rather low because any amount is functional, but it should be above about 0.01% by weight in the aqueous emulsion or suspension and best above 0.1%. The high level would be any amount that allows for enough water to carry out the reactions and provide the desired safety conditions, and could be 20% or even higher at the front end of the contacting apparatus. A preferred range would be about 0.1 to 10.0% by weight in order to obtain good results, and optimally from 0.2 to 3% by weight. The pH may also vary over a large range up to a pH of 9 and any pH under 9 appears to be operative for purposes of oxidizing the $P_4$. However, for removing (i.e. absorbing) $NO_x$ and also other materials such as $SO_2$ the pH should be about 3.0 or above, in the range of about 3.0-9.0, preferably 3.0-7.0. A pH higher than 9.0 can give undesirable by-products.

Another primary object of the invention is to produce a phosphoric acid ($H_3PO_4$) product during the $NO_x$ removal process.

In this process the yellow phosphorus oxidizes to $P_4O_{10}$, commonly called phosphorus pentaoxide or $P_2O_5$, during contact of the phosphorus aqueous emulsion or suspension with oxygen present in the exhaust gases. The $P_4O_{10}$ then associates with water droplets or water vapor to become phosphoric acid in the form of a white smoke or phosphoric acid mist which can be collected by various methods. The minimum contact time of the phosphorus emulsion or suspension with the exhaust gases should be about 0.5 seconds for a spray type scrubber and about 0.05 seconds in a bubbling type scrubber. When the pH of the emulsion or suspension is about 3 or greater, the scrubber becomes an absorber of $NO_2$ and $SO_2$ and the duration of the contact time becomes critical in that too long a contact time will result in the $P_4$ being converted to phosphates. For the purpose of recovering phosphoric acid the contact time should be no longer than about 10 seconds in a spray type absorber and about 3.5 seconds in a bubbling type absorber.

Another object of the invention is to provide a process wherein both $NO_x$ and $SO_2$ are removed in a single process using an apparatus which is now conventional in $SO_2$ removal processes, and wherein valuable by-products are obtained.

As indicated above, the yellow phosphorus emulsions or suspensions are especially suitable when the pH is adjusted to within the range of about 0.0 to about 9.0, and such adjustment, if needed, may be made by using any suitable alkaline material. When the emulsion is kept alkaline, $NO_2$ and sulfur dioxides are also removed. By using limestone, or one of the alkalis mentioned in the background section above for flue gas desulfurization, the advantages of such processes are obtained along with removal of $NO_x$. The resulting by-products could therefore include phosphate, nitrate, and sulfate salts of calcium, magnesium, sodium, potassium and ammonium. These products are important nutrients for plants and constitute the major components of fertilizers.

Still another object of the invention is for phosphoric acid to be the by-product in the $NO_x$ and $SO_2$ removal process which uses an apparatus conventional in $SO_2$ removal processes.

A further object of the invention is the provision of a process for removing $NO_x$ and $SO_2$ from flue gas and the like which is capable of taking out substantial amounts of the $NO_x$ (about 20%-95%) and $SO_2$ (about 40%-98%) from the flue gas, and which also provides suitable by-products from the process.

Further objects and advantages will be apparent as the specification proceeds and the preferred embodiments are described in detail.

BRIEF DESCRIPTION OF THE DRAWINGS

FIG. 1 illustrates data in graphical form obtained from a group of experiments wherein NO is removed from a simulated flue gas using different amounts of yellow phosphorus.

FIG. 2 shows data in graphical form obtained from a group of experiments wherein NO is removed from a simulated flue gas using yellow phosphorus emulsions at various temperatures.

FIG. 3 shows data in graphical form obtained from a group of experiments wherein NO is removed from a simulated flue gas using an aqueous emulsion of yellow phosphorus at various pH conditions.

FIG. 4 shows data in graphical form obtained from a group of experiments wherein NO is removed from a simulated flue gas using yellow phosphorus and wherein the amount of oxygen in the flue gas is varied.

FIG. 5 shows data in graphical form obtained from an experiment wherein both NO and $SO_2$ are removed from a simulated flue gas using a mixture of an aqueous emulsion of yellow phosphorus and a slurry of limestone.

FIG. 6 is a schematic diagram illustrating a 20 acfm bench-scale wet phosphorus/limestone process using a spray tower scrubber.

FIG. 7 is a schematic diagram illustrating a bench-scale Bechtel CT-121 type scrubber consisting of a spray tower prescrubber and a bubbling absorber.

FIG. 8 shows data in graphical form obtained from an experiment wherein NO is removed from a simulated flue gas over a period of about three hours using a yellow phosphorus emulsion in a prescrubber and a limestone slurry in a bubbling absorber. The P/NO ratio determined for this run was 0.73.

FIG. 9 shows data in graphical form obtained from a group of experiments wherein NO is oxidized and removed from a simulated flue gas in a spray tower scrubber wherein the flow rate of the simulated flue gas containing 310 ppm NO, 2000 ppm $SO_2$ and 5% $O_2$ is varied.

FIG. 10 shows data in graphical form obtained from a group of experiments wherein NO is oxidized in a spray tower prescrubber and removed in a bubbling absorber type scrubber.

FIG. 11 shows data in graphical form obtained from a group of experiments wherein NO is oxidized and removed from a simulated flue gas using a yellow phosphorus and limestone aqueous mixture in a spray tower scrubber and the contact time is varied.

FIG. 12 shows data in graphical form obtained from a group of experiments wherein NO is oxidized using yellow phosphorus in a CT-121 type prescrubber and the contact time is varied.

FIG. 13 is a conceptual flow diagram of a wet phosphorus/limestone process for combined removal of $SO_2$ and $NO_x$.

DETAILED DESCRIPTION OF THE INVENTION

Certain fuels are already low in sulfur, and other fuels have been treated to remove sulfur prior to combustion. In such cases, sulfur oxide pollution is not a serious problem and generally the exhaust gases are discharged to the atmosphere without treatment. These fuels frequently contain nitrogen compounds that appear in the exhaust gas as $NO_x$. In addition, $NO_x$ may be produced from high temperature decomposition of $N_2$ and $O_2$ in air during the combustion and it is now desired to treat such exhaust gases. For example, power plants using natural gas in California emit exhaust gases with the $NO_x$ concentration greater than 75 parts per million, while the California standards are being set to require emissions of less than 25 parts per million $NO_x$.

We have discovered that $NO_x$ can be removed from flue gas using an aqueous emulsion containing liquid yellow phosphorus. The factors influencing the effectiveness of NO removal of our system relate to the NO oxidation efficiency and include the amount of phosphorus used, the temperature of the aqueous emulsion, the pH of the aqueous emulsion, the contact time of the gases with the emulsion and the $O_2$ concentration in the flue gas.

As used herein, we express the effectiveness for NO removal of a yellow phosphorus emulsion as the stoichiometric ratio P/NO, which is defined as the number of moles of phosphorus needed to remove one mole of NO averaged over the entire period of an experiment (usually 2 hours). Therefore, the higher the stoichiometric ratio, the more phosphorus is required to remove each mole of NO, the lower the effectiveness for NO removal and vice versa.

It should be pointed out that the reaction mechanism for NO removal by yellow phosphorus is distinctively different from that using red phosphorus. The reaction between yellow phosphorus and NO appears to take place in both aqueous and gas phase due to the low melting point (44.1° C.) and high vapor pressure of yellow phosphorus. On the other hand, red phosphorus at atmospheric pressure is solid up to a temperature of about 417° C. (where it sublimes), and therefore has a very low vapor pressure at the reaction temperatures employed herein (about 20° C. to 95° C.). In this case, the absorption of NO is likely to be solid-gas type. Furthermore, the NO-derived products using yellow phosphorus have been determined to include $NO_2^-$ and $NO_3^-$, both oxidation products of NO, whereas in the case of red phosphorus, it was claimed in the Hoechst AG patent (cited above) that $N_2$, a reduction product of NO, was the only nitrogen product obtained. The difference in NO-derived products in these two cases also suggests different reaction mechanisms are involved.

The phosphorus oxidation process may also be directed to the production of phosphoric acid. The experiments such as those in Examples 1, 2, 3, 4 (infra) which removed $NO_x$ from simulated flue gas were all carried out in a 2 inch diameter bubbling absorber column with 200 ml of reaction mixture. The gas flow rate in these experiments was about $3.5 \times 10^{-2}$ acfm (1 liter/min), corresponding to a superficial gas velocity of 0.028 ft/sec in the absorption column and a contact time of flue gas with scrubbing liquors of approximately 12 sec. However, in a commercial scrubber system, the superficial velocity of flue gas is much faster (8–12 ft/sec), and the contact time much shorter (2–5 sec). Consequently, the mass transfer and chemical reaction kinetics are less favorable under the conditions of a commercial system. In order to determine whether the $P_4$ additive is still effective with wet limestone systems at realistic conditions, a 20 acfm bench-scale scrubber system was constructed that simulates as close as possible the conditions of a commercial system. Under these conditions, the major oxidation product of $P_4$ is phosphoric acid. In the phosphorus oxidation process finely divided phosphorus pentaoxides are generated which pick up moisture to form phosphoric acid aerosols giving the appearance of white smoke. Recovery of the white smoke yields a valuable by-product, phosphoric acid. A preferred method of recovery is to absorb the phosphorus "white smoke" with concentrated phosphoric acid (40–75%).

The P/NO ratios determined were in the range of about 1.0–1.5 when a bench-scale spray tower was used as the absorber, and about 0.6–1.0 when the CT-121 type bubbling configuration was the absorber. The P/NO ratios were determined from batch runs. A known weight of $P_4$ was added in water, then the experiment was carried out until the NO removal reached zero. By integrating the NO removal curve for the entire period of the experiment, and knowing the amount of $P_4$ used, the P/NO ratio was calculated. A P/NO determination for a constant removal efficiency of NO has not been performed.

An investigation of factors affecting P/NO is underway. A large amount of O (atomic oxygen) was detected in the reaction zone during the reaction of $P_4$ with $O_2$. The reaction is believed to proceed via a branched-chain mechanism. (See, N. N. Semenov. "Die Oxydation des Phosphordampfes bei Niedrigen Drucken." *Z. Phys.* 46, 109, 1927.) Investigators have identified several elementary reactions involved in the chain, and have determined rate constants for some of the reactions. However, a complete list of elementary reactions is not yet available. Dainton and Kimberly (See, F. S. Dainton and H. M. Kimberly. "Reaction between Phosphorus Vapor and Oxygen." *Trans. Faraday Soc.* 46, 629, 1950.) have proposed the following reaction scheme:

$$P_4 + O_2 \rightarrow P_4O + O \tag{1}$$

$$P_4O_n + O_2 \rightarrow P_4O_{n+1} + O \tag{2}$$

where $n = 1, 2, \ldots 9$

The overall reaction is $$P_4 + 10\, O_2 \rightarrow P_4O_{10} + 10^* \tag{3}$$

The reaction of O with $O_2$ forms $O_3$, in the presence of another molecule M which remains unchanged after the reaction:

$$10^* + 10\, O_2 + 10M \rightarrow 10\, O_3 + 10M \tag{4}$$

According to this reaction scheme, each $P_4$ reacts with 10 $O_2$ to generate 10 $O_3$. If all the $O_3$ produced oxidizes NO to $NO_2$, the P/NO ratio will be 0.4, provided the removal of NO occurs by the dissolution of $NO_2$ (or $N_2O_4$). The P/NO ratio will be 0.2 if the removal of NO occurs by the dissolution of $N_2O_3$. In reality, the dissolution of a mixture of $NO_2$ and $N_2O_3$ in the scrubbing liquor is more likely. The $O_3$ generated may be consumed by reaction with $SO_2$ through gas phase as well as liquid phase reactions, which would increase the P/NO ratio. The gas phase reaction $SO_2 + O_3 \rightarrow SO_3 + O_2$ is much slower (rate constant $k < 8 \times 10^{-24}$ cm$^3$. molecule$^{-1}$. sec$^{-1}$ at 20° C.) than $NO + O_3 \rightarrow NO_2 + O_2$ ($k = 1.7 \times 10^{-14}$ cm$^3$ molecule $^{-1}$ sec$^{-1}$ at 20° C.) and is negligible. (See, J. G. Calvert, F. Su, J. W. Bottenheim, and O. P. Strausz. "Mechanism of the Homogeneous Oxidation of Sulfur Dioxide in the Troposphere." *Atmos. Environ.*, 12, 197, 1978 and H. S. Johnston, S. G. Chang, and G. Whitten, "Photolysis of Nitric Acid Vapor." *J. Phys. Chem.*, 78, 1, 1974 respectively.) The reaction of $O_3$ with $HSO_3^-/SO_3^{2-}$ in liquid phase is fast, but takes place only after the dissolution of $O_3$ in scrubbing liquors. The solubility of $O_3$ is small. The Henry's constant of $O_3$ is $1.23 \times 10^{-2}$ M.atm$^{-1}$ at 20° C. The concentration of gaseous $O_3$ produced is related to the vapor pressure of $P_4$, which is about 325 ppm at 50° C. (In reality, $P_4$ concentration is expected to be much smaller because of kinetic limitation. The residence time of spray in a column is short. The $P_4$ evaporation rate from the spray is the rate determining step.) One can calculate that the concentration of $O_3$ dissolved in the liquor is only $4.0 \times 10^{-5}$M when in equilibrium with 3250 ppm of $O_3$, the upper limit in a spray column. Therefore, the dissolved $O_3$ is only a small fraction (less than 1%) of the total $O_3$ at a typical L/G ratio (60–120). Also, $O_3$ can be consumed by $P_4$ during its oxidation. The rate constants of reaction of $O_3$ with $P_4$ and its oxidation derivatives have not been reported. It is difficult to estimate the fraction of $O_3$ that would be consumed by phosphorus containing species. However, the reaction rate constants of $P_4$ with $O_2$ is comparable to that of $P_4$ with O. The concentration of $O_2$ is orders of magnitude larger than O. Most of the $P_4$ is expected to be oxidized by $O_2$. Based on the chemistry described, the presence of $SO_2$ in the flue gas is probably not going to affect the result significantly. The P/NO ratio can be improved by using good mixing conditions, where the $P_4$ spray is dispersed uniformly and the $O_3$ is accessible to the NO in the flue gas. Also, as stated previously, the temperature, $P_4$ concentration of the spraying liquor, NO and $O_2$ concentrations in the flue gas, and L/G will influence the P/NO ratio. Furthermore, $O_3$ and O may be consumed on the surface of the wall. A large-diameter spray column will reduce this wall effect and improve the effectiveness of $P_4$ utilization.

The fate of $P_4$, NO, and $SO_2$ in the system has been studied. The reaction of $P_4$ with $O_2$ generated phosphoric acid as white smoke. The concentration of white smoke in flue gas appeared to decrease slightly as the flue gas passed through the absorber but the amount absorbed was not a substantial portion (i.e. less than 25%). The analysis of the scrubbing liquor by ion chromatography showed that the liquor contained phosphorus-containing species adding up to only 8–12%, and 15–25% of the $P_4$ consumed with a spray tower and with a CT-121 type absorber, respectively. The unabsorbed white smoke could be removed from the flue gas by treating it downstream from the absorber with concentrated preferably 40%–75%, phosphoric acid. The oxidation products of $P_4$ consisted of phosphoric acid ($H_3PO_4$), phosphorous acid ($H_3PO_3$), and hypophosphorous acid ($H_3PO_2$), with their molar ratio roughly in 10, 2, and 0.2, respectively, at the experimental conditions employed.

The analysis of scrubbing liquors revealed the presence of nitrogen-sulfur compounds, in addition to $NO_3^-$, $HSO_3^-$, $SO_4^{2-}$, $H_2PO_4^-$, $H_2PO_3^-$, and $H_2PO_2^-$. Only 5 to 15% of the NO removed was converted to $NO_3$. The majority of NO absorbed was found to be converted to nitrogen-sulfur compounds. The nitrogen-sulfur compounds are intermediates produced from the reaction of $NO_2^-$ with $HSO_3^-$. Many concurrent and consecutive reactions can take place and result in the production of intermediates, including hydroxyimidodisulfate [HON(SO$_3^-$)$_2$], hydroxysulfamate [HONHSO$_3^-$], hydroxylamine [NH$_2$OH], nitridotrisulfate [N(SO$_3^-$)$_3$], imidodisulfate [HN(SO$_3^-$)$_2$], and sulfamate [NH$_2$SO$_3^-$]. These nitrogen-sulfur intermediates have different reactivities and exhibit different half-lifes in the scrubbing system. The steady state concentrations of these intermediates vary depending on the scrubbing conditions. Hydroxyimidodisulfate and imidodisulfate are two intermediates most often found in high concentrations under the experimental conditions employed. When there is an excess of $HSO_3^-$ present in the liquor, such as conditions encountered using flue gas from a high-sulfur coal, these nitrogen-sulfur compounds are converted eventually to sulfamate ion, which then hydrolyzes to produce $NH_4^+$ ion in an acidic medium.

$$NO_2^- + 2HSO_3^- \rightarrow HON(SO_3)_2^{2-} + OH^- \tag{5}$$

$$HON(SO_3)_2^{2-} + HSO_3^- \rightarrow N(SO_3)_3^{3-} + H_2O \tag{6}$$

$$N(SO_3)_3^{3-} + H_2O \rightarrow HN(SO_3)_2^{2-} + SO_4^{2-} + H^+ \tag{7}$$

$$HN(SO_3)_2^{2-} + H_2O \rightarrow H_2NSO_3^- + SO_4^{2-} + H^+ \tag{8}$$

$$H_2NSO_3^- + H^+ \rightarrow H_2NSO_3H \tag{9}$$

$$H_2NSO_3H + H_2O \rightarrow NH_4^+ + SO_4^{2-} + H^+ \tag{10}$$

The overall reaction is $$NO_2^- + 3HSO_3^- + H_2O \rightarrow NH_4^+ + 3SO_4^{2-} + H^+ \tag{11}$$

A fraction of the absorbed $SO_2$ is converted to nitrogen-sulfur intermediates as described above. These intermediates will eventually decompose to form $SO_4^{2-}$ as the final product of absorbed $SO_2$.

The invention is illustrated further by the following examples which are not to be construed as limiting the scope of the invention.

EXAMPLE 1

The removal of NO from flue gas by yellow phosphorus in water was studied using a bench scale scrubber. The scrubber was an upright cylindrical Pyrex column (50 mm i.d. ×210 mm) with a fritted disc bottom capable of holding aqueous liquid. The scrubber was equipped with a thermometer for measuring the temperature of liquid therein and a pH electrode for measuring the pH of the liquid therein. A water jacket was provided to heat or cool the contents of the scrubber, and appropriate feed lines to admit measured amounts of gases for the simulated flue gas are provided. With this set-up accurate amounts of NO, $N_2$, $O_2$ and $SO_2$ are provided to the scrubber. The downstream side of the scrubber is equipped with appropriate condensers, an absorber, cold trap and analyzers for $NO_x$ and $SO_2$. 1.0 gram of yellow phosphorus (m.p.=44.1° C.) was melted in 0.2 liters of water at 60° C. in the scrubber. The pH of the aqueous phase was between 3 and 4. Yellow phosphorus globules were dispersed in water upon the bubbling of a gaseous mixture containing about 500 ppm NO, from 0 to 20% $O_2$, and the balance $N_2$ through the bottom of the column at a flow rate of 0.8-1.0 liter per minute. In addition to these runs wherein the amount of $O_2$ was varied, other runs were made wherein the amount of phosphorus was varied, the temperature of the aqueous emulsion was varied, and in which the pH of the aqueous emulsion was varied.

The gas mixture leaving the reaction column was passed through a condenser (length=390 mm), a gas washing bottle containing 0.2 liters of a 0.2M NaOH solution, a second condenser (length=200 mm), and then a cold trap (−84° C.). The NO and $NO_2$ concentrations in the outlet gas was measured by a Thermoelectron Model 14A chemiluminescent $NO_x$ analyzer. The reaction was stopped after 2 hours. The pH of the scrubbing liquor and the NaOH absorber solution after the experiments were generally about 1.5 and 12.5, respectively. The NO and phosphorus derived products in the spent solution in the scrubber as well as the NaOH absorber were determined by ion chromatography.

The passage of the simulated flue gas mixture through the scrubbing column containing the molten phosphorus creates a fine yellow phosphorus dispersion in water. When $O_2$ is present in the flue gas, a dense white phosphoric acid fume is produced which could lead to a significant response from the chemiluminescent $NO_x$ analyzer if left unchecked. This is believed to result from the chemiluminescence produced by incomplete oxidation of phosphorus. This interference decreased substantially when the partial pressure of $O_2$ in the flue gas is increased, consistent with the complete oxidation of phosphorus under those conditions.

The use of a NaOH absorber and a cold trap coupled with the monitoring of the scrubbed flue gas using the $NO_x$ mode on the chemiluminescent analyzer (which involves passage of the gas mixture through a stainless steel column at 650° C. half of the time) eliminates the white fumes.

The reaction was carried out using various amounts of phosphorus in the emulsion (at pH 3), and with an $O_2$ concentration of 4% in the simulated flue gas. The results of these runs are shown graphically in FIG. 1. It is clear that the initial NO removal efficiencies were higher at higher concentrations of phosphorus and reaches about 90% at 2.0% by weight yellow phosphorus.

The effect of the temperature of the emulsion was determined in a number of experiments, and the results are shown in FIG. 2. In these runs, the emulsion contained 0.5% yellow phosphorus at pH 3 and the flue gas contained 550 ppm NO, 4.0% $O_2$, and the remainder $N_2$. Whereas the initial NO removal efficiencies were higher at higher temperatures, the overall effectiveness for NO removal were lowered under these conditions. For instance, the initial removal percentage of NO was increased from 78% to 99% when the temperature of the emulsion was raised from 50° C. to 75° C.

The influence of pH on the effectiveness for NO removal of a yellow phosphorus emulsion has been determined, and the results of the experiments are shown in FIG. 3. In these runs, the $O_2$ content was adjusted to 4% by volume. As shown in FIG. 3, the effectiveness for NO removal increases with increasing acidity of the aqueous phase over the pH range of 3.0 to 9.0.

The influence of $O_2$ concentration in the flue gas was also determined, and the data is shown in FIG. 4. As there shown, the presence of $O_2$ is essential for the removal of NO by yellow phosphorus emulsions. In addition, the effectiveness for NO removal of a phosphorus emulsion increases as the $O_2$ content of the simulated flue gas mixture increases. In these runs, the NO absorption reaction was carried out at pH 3 and 60° C. using a 0.5% by weight yellow phosphorus emulsion. The use of yellow phosphorus for the removal of flue gas works best under forced oxidation conditions.

Example 2 (comparison example)

A comparison of the NO removal effectiveness of yellow phosphorus and red phosphorus was made for use in treating simulated flue gases having 500 ppm NO using the apparatus of Example 1. Both emulsions of 0.5% by weight yellow phosphorus and suspensions of 1.5% by weight red phosphorus were used to treat a simulated flue gas of 500 ppm NO and 4% $O_2$ at 60° C. The yellow phosphorus emulsion removed up to 80% of the NO whereas none of the red phosphorus emulsions removed any detectable amount. At pH 9, the yellow phosphorus emulsion removed up to 40% of the NO whereas the red phosphorus still did not remove a detectable amount. At pH 10.1, the red phosphorus did remove some NO but the effectiveness was still very low (P/NO about 1,000).

Example 3

Spray drying experiments were carried out using a Niro Atomizer portable spray dryer equipped with a Type M-02/a centrifugal atomizer. The volume of the spray drying chamber was about 350 liters, and the gas flow capacity was about 500 liters per minute. Yellow phosphorus was introduced to the spray dryer chamber either in liquid form (as an emulsion in water) or in solid particulate form (as a fine particulate dispersion in water prepared by the rapid cooling of a phosphorus in water emulsion from about 80° C. to room temperature). The inlet temperature of the simulated flue gas mixture (containing 490 ppm NO, 20% $O_2$, and the balance $N_2$) was 170° C. and the exit gas temperature was 65° C. Using a 0.25% by weight yellow phosphorus emulsion up to 40% of the NO was removed. In a separate experiment, fine particulate dispersions of yellow phosphorus (5% by weight) also containing 3.2M urea were used in the spray drying system. The simulated flue gas contained about 550 ppm NO, and up to about 70% of the NO was removed. It is expected that higher removals may be achieved using a more concentrated phosphorus emulsion and/or under better operating conditions.

Example 4

In this example, various levels of NO in the simulated flue gas were treated using the apparatus of Example 1. The 150 cc aqueous emulsion contained 1.0 gram of $CaCO_3$ in all cases except Example 4f, where a pH 4.3 acetate buffer was used. The simulated flue gas contained 11-12% $O_2$, and the total gas flow rates were 0.8-1.0 liter per minute. Total experimental time ranged between 2 and 3 hours. Other operating conditions used, and the results obtained, are given in the Table below.

TABLE

| Example | NO (ppm) | Temp. (°C.) | Initial pH | Phosphorus added (gm) | Maximum % Removal | Average % Removal |
|---|---|---|---|---|---|---|
| 4a | 60 | 50 | 6.5 | 1.5 | 100 | 100 |
| 4b | 65 | 50 | 6.3 | 0.8 | 100 | 100 |
| 4c | 400 | 50 | 6.2 | 0.8 | 80 | 43 |
| 4d | 430 | 50 | 7.4 | 1.5 | 100 | 76 |
| 4e | 1950 | 50 | 6.2 | 3.1 | 55 | 29 |
| 4f | 2000 | 75 | 4.3 | 4.0 | 95 | 72 |

From these examples, it is seen that very efficient removal is achieved at 50° C. when low concentrations of NO are to be removed. In the examples given, satisfactory removal of higher concentrations of NO were achieved at 75° C.

Example 5

The simultaneous removal of NO and $SO_2$ from a simulated flue gas was carried out using a yellow phosphorus emulsion mixed with a slurry of limestone. The apparatus used in this experiment is similar to that of Example 1, except that the reactor had a volume of about 1.2 liter (110 mm i.d. × 130 mm). 0.9 liters of an aqueous emulsion/slurry containing 3.3% by weight of yellow phosphorus and 5.0% by weight of $CaCO_3$ was dispersed by a magnetic stir bar. The temperature of the scrubbing liquor was kept at 55° C. and the pH was 7.5. The absorber was provided with a 5 0% by weight slurry of $CaCO_3$. A simulated flue gas mixture containing 560 ppm NO, 2900 ppm $SO_2$, 10% $O_2$, and the balance $N_2$ was bubbled into the slurry at a rate of about 1.3 liters per minute. The reaction temperature was maintained at 55° C., whereas the pH of the slurry dropped from about 7.5 to about 4.2 after 3 hours. The removal rates of NO and $SO_2$ are shown in FIG. 5 wherein it is seen that the removal of $SO_2$ quickly reaches about 100% and shortly thereafter the removal rate of NO reaches about 100%. From these data, it appears that NO removal by the use of yellow phosphorus is enhanced when $SO_2$ and limestone are present.

The solid and liquid phases in the scrubber and in the absorber were separated by suction filtration and analyzed. The solid collected from the scrubber after the reaction was analyzed by laser Raman spectroscopy; and was shown to contain $CaSO_4.2H_2O$, in addition to unreacted $CaCO_3$ and yellow phosphorus. In the absorber downstream, only unreacted $CaCO_3$ was detected. No $CaSO_3.\frac{1}{2}H_2O$ precipitate was detected in either the scrubber or the absorber.

It was found that both the scrubbing liquor and the absorbing solution contain $NO_2^-$, $NO_3^-$, $SO_3^=$, $SO_4^=$, $H_2PO_2^-$, $H_2PO_3^-$, and $H_2PO_4^-$. Since the amount of $NO_2^-$ and $NO_3^-$ recovered could account for only about 50% of the NO absorbed and a substantial amount of $HSO_3$ was present in the scrubbing liquor, a search for nitrogen-sulfur compounds was conducted. Indeed, we found that about 40% of the NO absorbed could be accounted for by the formation of the nitrogen-sulfur compounds hydrozylamine disulfonate (HADS) and amine disulfonate (ADS) in a slightly acidic (pH about 4) scrubbing liquor. We also found that both HADS and ADS were subsequently hydrolyzed to $NH_4^+$ in the scrubbing liquor when the pH was lowered to about 2. The formation of nitrogen-sulfur compounds via the reaction of $NO_2^-$ and $HSO_3^-$ in scrubbing liquor and their hydrolysis reactions have been well studied, and the $NH_4^+$ formation follows from these studies. Therefore the use of yellow phosphorus emulsions for combined $NO_x$ and $SO_2$ removal results in the conversion of undesirable NO to $NH_4^+$, $NO_3^-$, and $NO_2^-$, all of which are desirable chemicals for the manufacture of fertilizer.

Example 6

A simulated flue gas mixture with about 5% oxygen was prepared by passing liquid nitrogen from a standard pressurized 160 liter dewar through a vaporizer column (Hex Industries) and by mixing the gas with compressed air to obtain the desired oxygen concentration. NO and $SO_2$ were blended in to give concentrations of 275-350 ppm and 1500-3000 ppm, respectively. $CO_2$ could be added up to approximately 10% of the total gas flow. The gas stream flowed, at a rate of 20 acfm, through an electric air heater where it was heated to a temperature of 350° F. The heated gas then entered the absorber. Two types of absorbers were tested: a spray tower type and a bubbling type absorber. The spray tower absorber was a 4 in diameter by 4 ft long glass column installed with spray nozzles (Spraying Systems, Inc.). Two different spray nozzle set-ups were tested: a two nozzles (2.0 gal/min per nozzle) in series set-up and a ten nozzle (0.2 gal/min per nozzle) set-up, in which nozzles were divided into two parallel rows with each row containing 5 nozzles in series. An aqueous mixture of $P_4$ and limestone slurry was sprayed in the absorber. A countercurrent flow of flue gas entered at the base of the absorber and passed upward through the falling spray of slurry as shown in FIG. 6.

The bubbling absorber was a scaled-down simulation of the Bechtel CT-121 system. As shown in FIG. 7, the bubbling absorber system included a prescrubber and a scrubber. The spray tower column just described was used as a prescrubber. The scrubber column was constructed of a 4 in diameter by 4 ft section stainless steel pipe. Four ⅜ in diameter stainless steel tubes served as impingers directing the gas into the limestone slurry at the bottom of the column. An aqueous emulsion of $P_4$ was sprayed downward in a prescrubber which quenched and conditioned the flue gas flowing upward. The pretreated flue gas then entered a scrubbing column downward through impingers that submerged about 10 inches under the aqueous limestone slurry. A froth layer was formed when the gas entered the scrubber, which provided a greatly extended interfacial area for gas-liquid contact. Air (0.85 cfm) was fed into the bottom of the scrubber to force oxidize the $HSO_3^-$ to $SO_4^{2-}$. Probes in the column allowed measurements of pH and temperature.

The concentration of $P_4$ in the scrubbing liquors ranged from 0.5 to 0.8% w/w, while that of limestone was 6–10% w/w. A 2-liter Erlenmeyer flask was used as a holding tank for liquid mixture from the spray column. A liquid mixture was recirculated with a centrifugal pump (Price Pump Co.) to the top of the spray column. The pH of the scrubbing liquor was controlled by feeding an aqueous mixture of limestone and lime from a thermostatted reservoir (50° C.) to the hold tank by a Masterflex pump (Randolph-Austin Corp.). The pH range studied was 3.5 to 6. The hold tank temperature was controlled at 50°–55° C. $P_4$ could be continuously fed into the system from a burette containing liquid $P_4$ and water. $P_4$ (specific gravity 1.80) settled at the bottom of the burette. The burette was wrapped with a heating tape to maintain the temperature of $P_4$ in the burette above 44° C., its melting point.

The gas from the absorber was then directed through a washing column. In the washing column, concentrated phosphoric acid (40–60%) was sprayed through a 1 gal/min nozzle (Spraying Systems, Inc.) and recirculated by a centrifugal pump to absorb the phosphorus "white smoke". The phosphoric acid "white smoke" was produced by oxidation of the $P_4$ to phosphorus pentaoxides which picked up moisture to form phosphoric acid "white smoke" aerosols.

The $NO_x$ chemiluminescent analyzer and the $SO_2$ fluorescent analyzer have intake connections to the gas stream at various points along the system. The NO, $NO_x$ and $SO_2$ concentrations can thus be measured and the effectiveness of the absorber operation can be evaluated.

Liquids from the different columns in the system can be analyzed by ion chromatography and laser Raman spectroscopy to determine the identity and concentration of the anions present. The solid precipitates can be analyzed by FTIR and laser Raman spectroscopy.

At a flow rate of 20 acfm, the superficial velocity of flue gas in a 4 in diameter column was about 4 ft/sec, which is typical in a CT-121 scrubber. This is slower than that in spray tower systems, where the velocity is 8–12 ft/sec. However, the gas-liquid contact time and liquid gas (L/G) ratio are more significant physical parameters to simulate when scaling down. In the case of a spray tower scrubber, the contact time of gas and liquid sprays is about 2–5 sec and L/G ranges between 60 and 120 depending on the $SO_2$ concentrations and removal requirements. In the case of a CT-121 scrubber, the $SO_2$ removal efficiency is a function of the depth of submergence of the spargers. A submergence of 8 inches will generally provide 90% removal efficiency with a gas superficial velocity of 4 ft/sec. A 10-inch submergence was provided in the test equipment. The height of froth layer created in a 4 inch column is somewhat larger than that in a commercial reactor, however. The main objective of the small bench-scale test was to prove the concept of $NO_x$ removal simultaneously with $SO_2$ removal in wet limestone systems, and not to obtain data for scale-up to a commercial size.

The results of a typical run on the removal efficiency of NO and $SO_2$ is shown in FIG. 8. This was a run using a bubbling absorber. An aqueous emulsion of $P_4$ initially containing 0.8% w/w $P_4$ was sprayed and recirculated in the prescrubber. The initial limestone concentration in the bubbling scrubber was 6% w/w and the temperature of the limestone slurry was 55° C. The flue gas contained 300 ppm NO, 1500 ppm $SO_2$ and 4.5% $O_2$. The flow rate of flue gas was 15.60 acfm, corresponding to a superficial velocity ($V_f$) of 3.3 ft/sec in the column. The removal efficiency of NO could be maintained at more than 85% during most of the experiment until near the end of the run, when the concentration of $P_4$ was substantially depleted. Also, the initial removal efficiency of NO was not as good. This is attributed to the poor mixing of $P_4$ with water at the beginning of the experiment. The spray nozzles can break up $P_4$ globules and create a finely dispersed $P_4$ emulsion in water. The removal efficiency of $SO_2$ depends strongly on the pH of the scrubbing liquor. Initially, $SO_2$ was removed completely at a pH of 5.5. The efficiency dropped to about 90% when the pH of slurry decreased to 4.5.

The NO removal efficiency measures the effectiveness of $NO_x$ absorption in the scrubbing liquor, and depends on the extent of NO oxidation to $NO_2$, the mixing of flue gas with liquor, and sulfite/bisulfite ion concentration. The oxidation efficiency measures the effectiveness of the oxidation of NO to $NO_2$ by the $P_4$-induced oxidation method. As stated previously, the NO oxidation efficiency is related to the concentration of $P_4$ in the spray liquor, $O_2$ concentration in the flue gas, temperature, and the mixing of the spray with flue gas. The factors influencing the mixing include the L/G ratio, size and uniformity of the spray, and the contact time.

Example 7

A set of experiments were conducted by varying the flow rate of flue gas at a constant flow rate of recycling liquor. As a result, the superficial velocity and contact time of the flue gas with the spray also varied. The apparatus and conditions, unless otherwise stated, were similar to those of Example 6. The resulting NO oxidation and removal efficiencies as a function of L/G and $P_4$ concentration are shown in FIGS. 10 and 11 for a spray tower and a bubbling scrubber, respectively. With a spray tower absorber, an aqueous emulsion of $P_4$ and limestone was sprayed and recirculated in a single spray column. Therefore, the generation of $O_3$, the oxidation of NO to $NO_2$ and the absorption of $NO_2$ and $SO_2$ in scrubbing liquor took place in one column. The oxidation efficiency was more than 80% at a L/G of 60, while the removal efficiency was only 60%. The removal efficiency did not reach 80% until a L/G of 90. The increase of $P_4$ concentration from 0.5% to 0.8% improved slightly both the oxidation and removal efficiencies. The effect was more apparent at low L/G values. With a CT-121 type scrubber, the oxidation occurred in a prescrubber where an aqueous emulsion of $P_4$ was sprayed, and the absorption took place in a bubbling absorber containing a limestone slurry. The oxidation efficiencies were more than 90% and the removal efficiencies more than 80% at a L/G of 60 or more. These results are better than those with a spray tower scrubber at given experimental conditions. This is attributed mainly to the difference in spray quality between two types of scrubbers. The spray nozzles are susceptible to clogging when the recirculating liquor contains limestone and gypsum particles. The limestone in the spray may also surround the $P_4$ droplets and reduce the effective concentration of $P_4$.

Because the diameter of the spray column is 4 in, the droplets hit the wall in a short distance after being sprayed. The liquor then flows down along the wall of the column and exhibits poor contact with flue gas. Consequently, the mixing in the bench-scale system is not as effective as that in a commercial scale system at a given L/G. The consideration of the contact time of the droplets with flue gas may be more meaningful. FIG. 11 shows a plot of the NO oxidation and removal efficiencies as a function of contact time. The results were obtained with a spray tower scrubber. The gas-droplet contact distance was estimated to be 2 ft. The contact time can be varied by changing the flow rate of the flue gas. The NO oxidation achieved 100% efficiency, and the $NO_x$ removal reached 90% efficiency with a contact time of 1.4 secs, which is less than that (2-5 secs) in a commercial system.

Example 8

The NO oxidation efficiency as a function of contact time in a prescrubber of a CT-121 simulation system was carried out. A plot of the results is shown in FIG. 12. The apparatus was similar to the one used in Example 7. The spraying liquor was composed of an aqueous emulsion of $P_4$ and did not contain limestone. The spray appeared to be more uniform and the nozzles did not show clogging problems. The contact distance was estimated to be 2.5 ft. The oxidation efficiency was slightly better than that in a spray tower system at the same contact time, but the improvement was less than the experimental uncertainty.

Based upon these experiments, a possible commercial conceptual process configuration with the following features is shown in FIG. 13.

- injecting a phosphorus emulsion into an existing wet limestone scrubbing system
- adding a "Brink" separator/hydrator downstream of the scrubber to capture and convert the $P_2O_5$ to phosphoric acid byproduct
- installing necessary equipment to recover other by-products (calcium phosphate and ammonium phosphate)
- adding new fan capacity to compensate for the additional pressure drop The actual P/NO requirement depends on the equipment (i.e. scrubber) used for contacting the gas and the phosphorus emulsion. In the bench-scale equipment used where the contacting time was short and the mixing was relatively inefficient, the required P/NO ratio was from 0.6 to 1.0. For more efficient contacting devices and longer contact time, as typically in most commercial scrubbers, a ratio around 0.5 can be reasonably expected.

While only illustrative embodiments have been described, it will be appreciated that various modifications may be made, and the invention is to be limited only by the spirit and scope of the appended claims.

What is claimed is:

1. A method of treating exhaust gases containing acid forming pollutants including NO and obtaining a phosphoric acid product which comprises the steps of contacting the exhaust gas with an aqueous emulsion or suspension of yellow phosphorus, oxidizing the phosphorus while in contact with said exhaust gases so as to generate phosphoric acid and oxidize the NO to $NO_2$, removing the $NO_2$ and recovering the phosphoric acid.

2. The method of claim 1 wherein the exhaust gas has a contact time of about 0.05 to about 3.5 seconds with the phosphorus emulsion or suspension when the contact occurs in a bubbling type absorber.

3. The method of claim 1 wherein the exhaust gas has a contact time of about 0.5 to about 10 seconds with the phosphorus emulsion or suspension when the contact occurs in a spray tower type absorber.

4. The method as defined in claim 1, wherein the temperature of the aqueous emulsion or suspension is from about 20° C. to about 95° C.

5. The method as defined in claim 1, wherein the temperature of the aqueous emulsion or suspension is from about 45° C. to about 75° C.

6. The method as defined in claim 1, wherein the amount of yellow phosphorus in the emulsion or suspension is from about 0.01 to about 20.0% by weight.

7. The method of treating exhaust gases as defined in claim 1, wherein the amount of yellow phosphorus in the emulsion or suspension is from about 0.1 to about 10.0% by weight.

8. The method as defined in claim 1, wherein the pH of the emulsion or suspension from about 0 to about 7.

9. The method as defined in claim 1, wherein the amount of oxygen in the flue gas being treated is between about 1% and about 16% by volume.

10. The method as defined in claim 9, wherein the oxygen content is adjusted by adding air to the exhaust gas.

11. A method of obtaining phosphoric acid from the treatment of exhaust gases containing $NO_x$ and $SO_2$, which comprises the steps of contacting the exhaust gases with an aqueous emulsion or suspension of yellow phosphorus and an amount of alkali sufficient to provide and retain a pH within the aqueous emulsion or suspension between about 3 and 9, oxidizing said phosphorus while in contact with said exhaust gas to generate $P_4O_{10}$ and O, allowing said $P_4O_{10}$ to associate with $H_2O$ to yield phosphoric acid and recovering said phosphoric acid.

12. The method of claim 11 wherein the exhaust gas has a contact time of about 0.05 to about 3.5 seconds with the phosphorus emulsion or suspension when the contact occurs in a bubbling type absorber.

13. The method of claim 11 wherein the exhaust gas has a contact time of about 0.5 to about 10 seconds with the phosphorus emulsion or suspension when the contact occurs in a spray tower type absorber.

14. The method as defined in claim 11 wherein the aqueous emulsion or suspension is maintained at a temperature of about 20° C. to about 95° C.

15. The method as defined in claim 11, wherein the aqueous emulsion or suspension is maintained at a temperature of about 45° C. to about 75° C.

16. The method of treating exhaust gases as defined in claim 11, wherein the alkali comprises calcium carbonate.

17. The method of treating exhaust gases as defined in claim 11, wherein the alkali comprises ammonia.

18. A method of treating exhaust gases containing initially from about 15 to about 3000 parts per million $NO_x$, which comprises the steps of providing an aqueous emulsion of yellow phosphorus wherein the amount of the phosphorus is from about 0.01 to about 20.0% by weight, and the temperature of the emulsion is between about 20° C. and about 95° C., and contacting the gas with the emulsion for a time sufficient to generate phosphoric acid and to reduce the concentration of $NO_x$ in the exhaust gas by about 20% up to about 95% of the initial concentration and for a time not sufficient to absorb a substantial portion of said generated phosphoric acid.

19. The method as defined in claim 18, wherein the exhaust gas also contains from about 100 to about 3,500 parts per million sulfur dioxide.

20. The method as defined in claim 19, wherein the aqueous emulsion also contains alkali.

21. The method as defined in claim 18, wherein the aqueous emulsion also contains calcium carbonate.

22. A method of treating exhaust gases containing initially from about 15 to about 3000 parts per million $NO_x$ and from about 100 to about 3,500 parts per million $SO_2$, which comprises the steps of:
(a) providing an aqueous emulsion of yellow phosphorus wherein the amount of the phosphorus is from about 0.01 to about 20.0% by weight, and the temperature of the emulsion is between about 20° C. and about 95° C.;
(b) contacting the gas with the emulsion for a time sufficient to oxidize said phosphorus to yield $P_4O_{10}$ with O, to generate phosphoric acid by contacting said $P_4O_{10}$ with $H_2O$ and for a time not sufficient to absorb a substantial portion of said generated phosphoric acid;
(c) further providing a solution or a second emulsion or suspension wherein said solution, or second emulsion or suspension contains an alkali; and
(d) contacting the solution or emulsion or suspension from step (c) with the exhaust gas from step (b) and a substantial portion of the phosphoric acid from step (b) for a time sufficient to reduce the concentration of $SO_2$ in the exhaust gas by about 40% to about 98% and to reduce the concentration of $NO_x$ in the exhaust gas by about 20% up to about 95% of the initial $NO_x$ concentration and for a time not sufficient to absorb a substantial portion of the phosphoric acid.

23. A method of treating exhaust gases containing initially from about 15 to about 1000 parts per million NO, which comprises the steps of providing an aqueous emulsion of yellow phosphorus wherein the amount of phosphorus is from about 0.1 to about 5.0% by weight, and the temperature of the emulsion is from about 45° C. to about 75° C., and passing the gas through the emulsion in direct contact therewith with the contact time being sufficient to oxidize said phosphorus to yield $P_4O_{10}$ and O, to generate phosphoric acid from said $P_4O_{10}$, and to reduce the concentration of NO in the exhaust gas by about 20% up to about 98% of the initial concentration and not being sufficient to absorb a substantial portion of said phosphoric acid.

24. A method of treating exhaust gases containing initially from about 15 to about 1000 parts per million $NO_x$, which comprises the steps of providing an aqueous emulsion of yellow phosphorus wherein the amount of phosphorus is from about 0.1 to about 5.0% by weight, and the temperature of the emulsion is from about 45° C. to about 75° C., and passing the gas through the emulsion in direct contact therewith with the contact time being sufficient to oxidize said phosphorus to yield $P_4O_{10}$ and O, to generate phosphoric acid from said $P_4O_{10}$, and to reduce the concentration of $NO_x$ in the exhaust gas by about 20% up to about 95% of the initial concentration and not being sufficient to absorb a substantial portion of said phosphoric acid.

25. A method of treating exhaust gases containing initially from about 15 to about 1,000 parts per million NO and from about 100 to about 3,000 parts per million $SO_2$, which comprises the steps of:
(a) providing an aqueous emulsion of yellow phosphorus wherein the amount of phosphorus is from about 0.1 to about 5.0% by weight, and the temperature of the emulsion is from about 45° C. to about 75° C.;
(b) passing the gas through the emulsion in direct contact therewith with the contact time being sufficient to oxidize said phosphorus to yield $P_4O_{10}$ and O, to generate phosphoric acid from said $P_4O_{10}$, and to reduce the concentration of NO in the exhaust gas by about 20% up to about 95% of the initial concentration and not being sufficient to absorb a substantial portion of said phosphoric acid;
(c) further providing a solution or a second emulsion or suspension wherein said solution or second emulsion or suspension contains an alkali; and
(d) passing the exhaust gas from step (b) and a substantial portion of the phosphoric acid from step (b) through the solution, emulsion or suspension from step (c) in direct contact therewith, the contact time being sufficient to reduce the concentration of $SO_2$ in the gas by about 40% to about 98% of the initial concentration and not being sufficient to absorb a substantial portion of said phosphoric acid.

26. A method of obtaining a phosphoric acid product from the treatment of exhaust gases containing acid forming pollutants including NO which comprises the steps of contacting the exhaust gases, an aqueous emulsion or suspension of yellow phosphorus and $O_2$ with each other to oxidize NO to $NO_2$ and to yield phosphoric acid, recovering the phosphoric acid and removing said $NO_2$.

27. A method of treating exhaust gases containing initially from about 15 to about 3000 parts per million $NO_x$, which comprises the steps of providing an aqueous emulsion of yellow phosphorus wherein the amount of the phosphorus is from about 0.01% to about 0.5% by weight, and the temperature of the emulsion is between about 20° C. and about 95° C., and contacting the gas with the emulsion for a time sufficient to oxidize the NO in the exhaust gas and reduce the concentration of $NO_x$ in the exhaust gas from about 20% up to about 95% of the initial concentration and to generate phosphoric acid but not to absorb a substantial portion of the generated phosphoric acid.

28. A method of treating exhaust gases containing initially from about 15 to about 1000 parts per million NO, which comprises the steps of providing an aqueous emulsion of yellow phosphorus wherein the amount of phosphorus is from about 0.01% to about 0.5% by weight, and the temperature of the emulsion is from about 45° C. to about 75° C., and passing the gas through the emulsion in direct contact therewith with the contact time being sufficient to oxidize said phosphorus to yield $P_4O_{10}$ and O, to generate phosphoric acid from said $P_4O_{10}$, and to oxidize the NO and reduce the concentration of NO in the exhaust gas to less than 10 ppm and not being sufficient to absorb a substantial portion of the phosphoric acid.

* * * * *